March 17, 1964    K. R. JOHNSON    3,125,134
MACHINE FOR FILLING PREFORMED CONTAINERS
Filed June 4, 1962    10 Sheets-Sheet 1
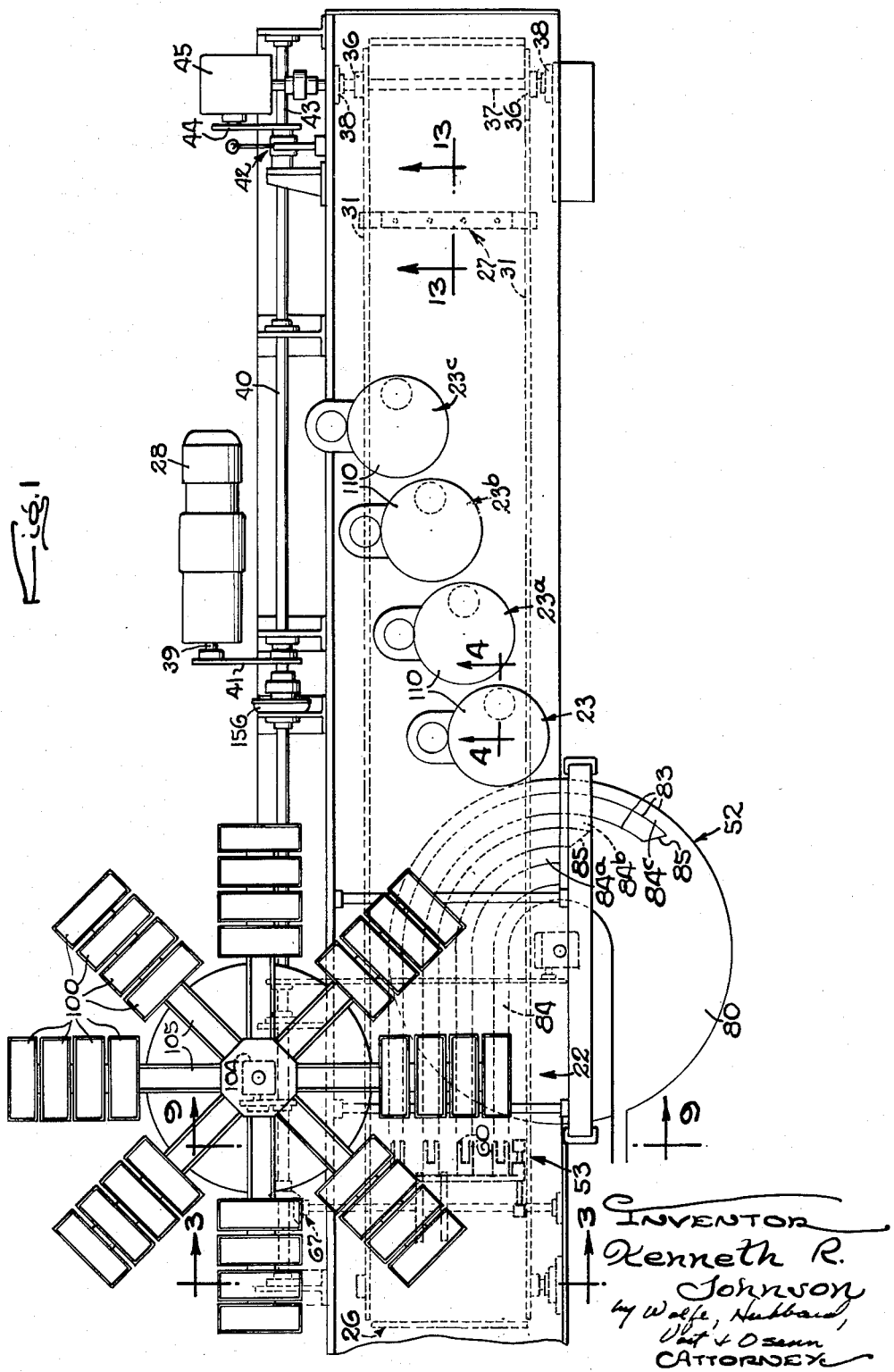

March 17, 1964
K. R. JOHNSON
3,125,134
MACHINE FOR FILLING PREFORMED CONTAINERS
Filed June 4, 1962
10 Sheets-Sheet 2
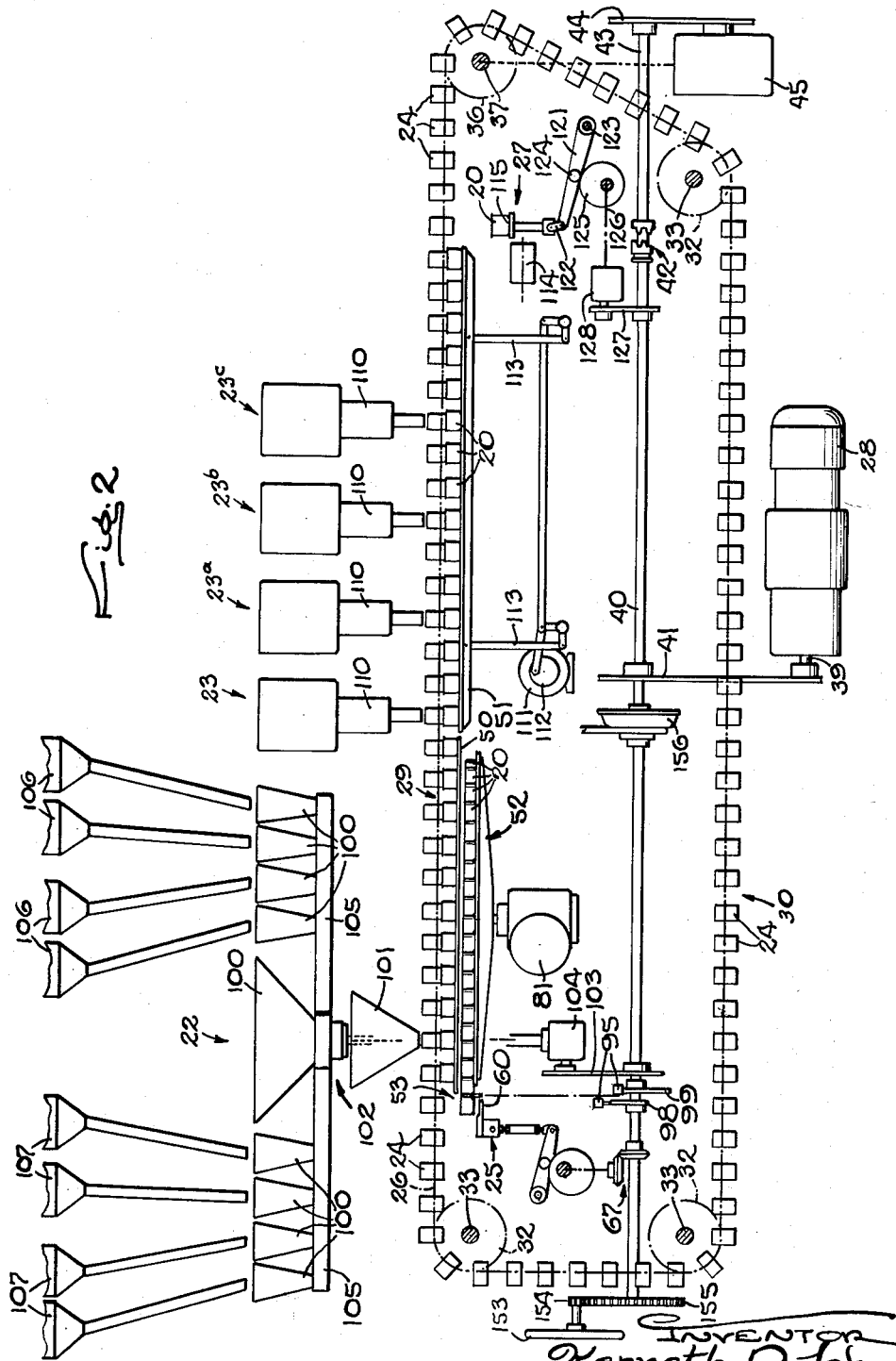

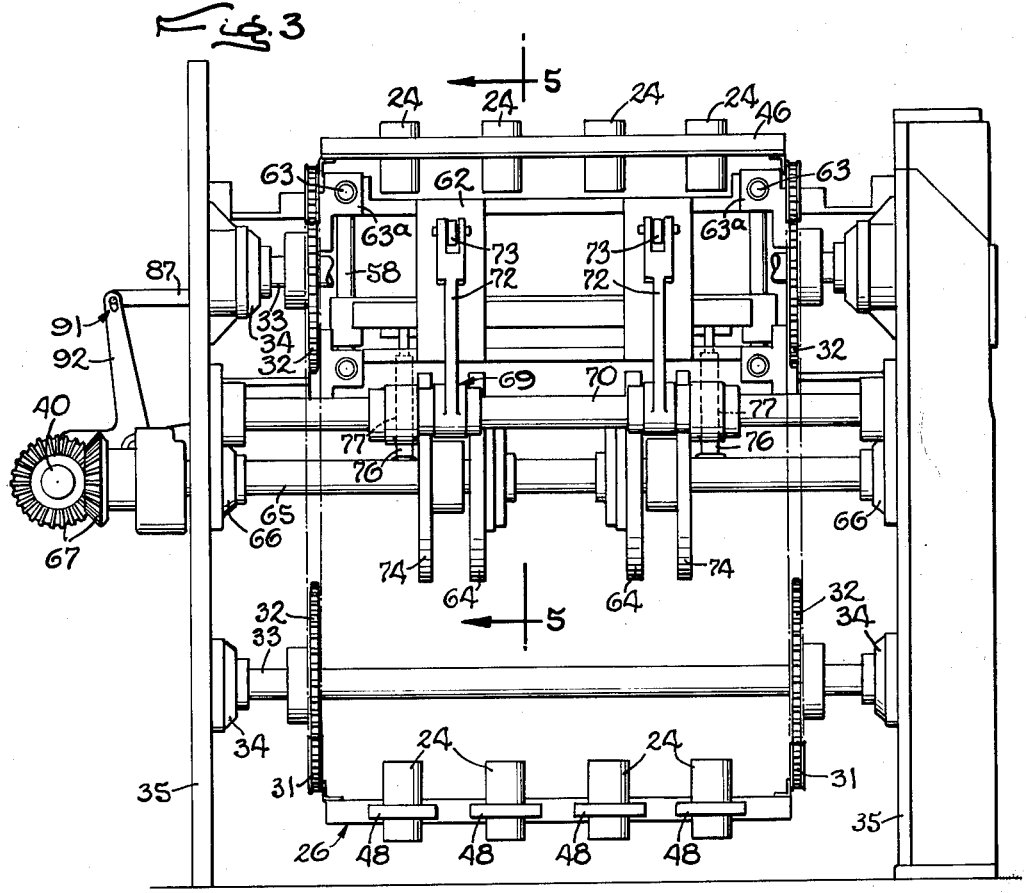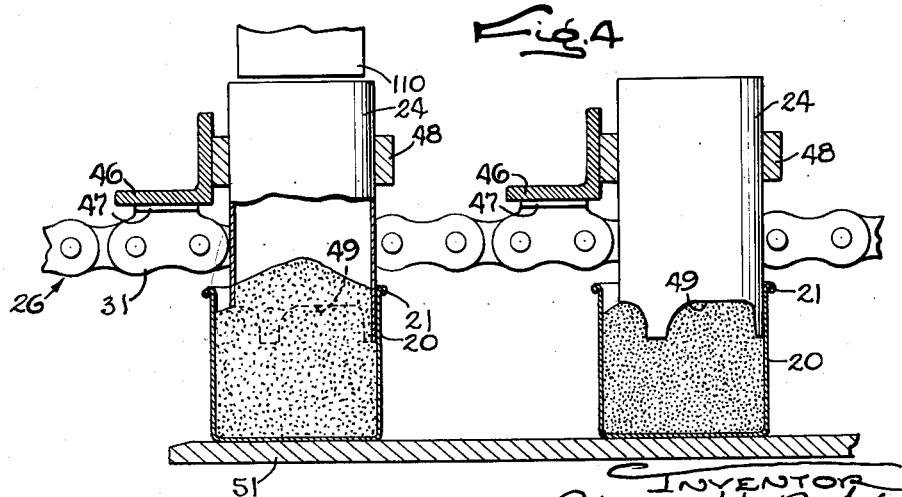

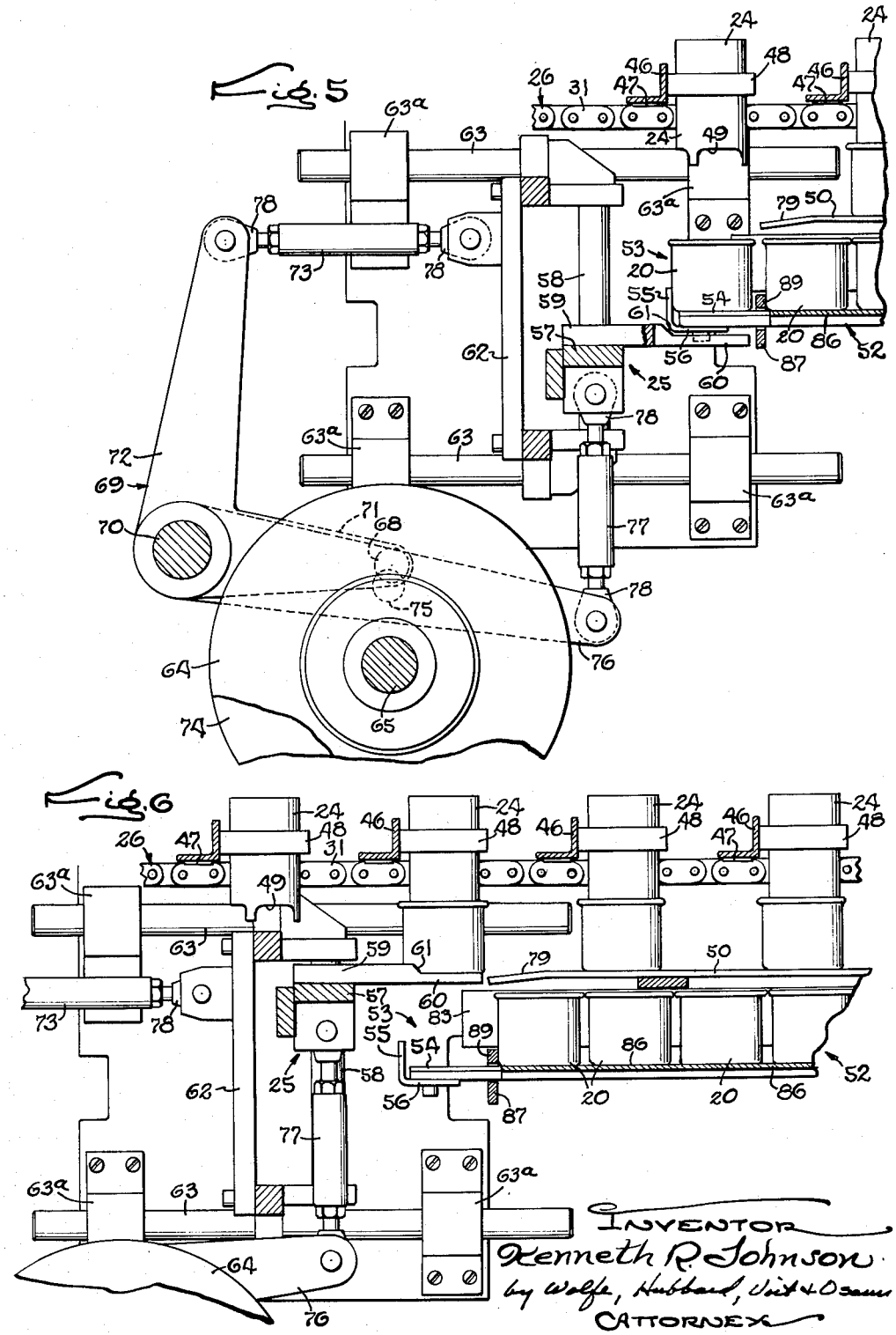

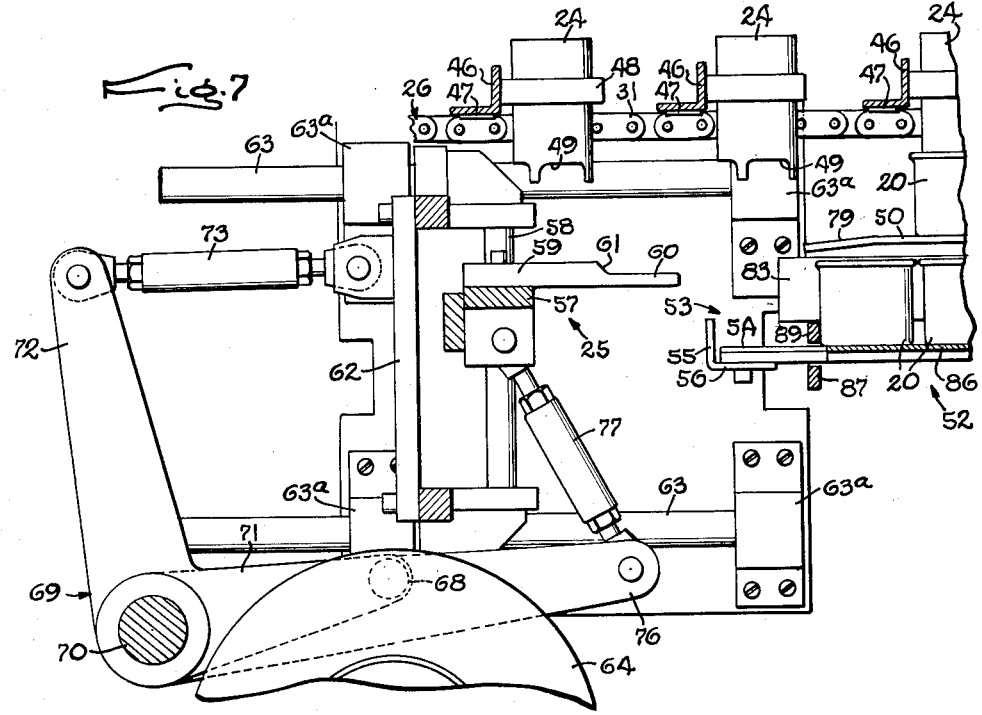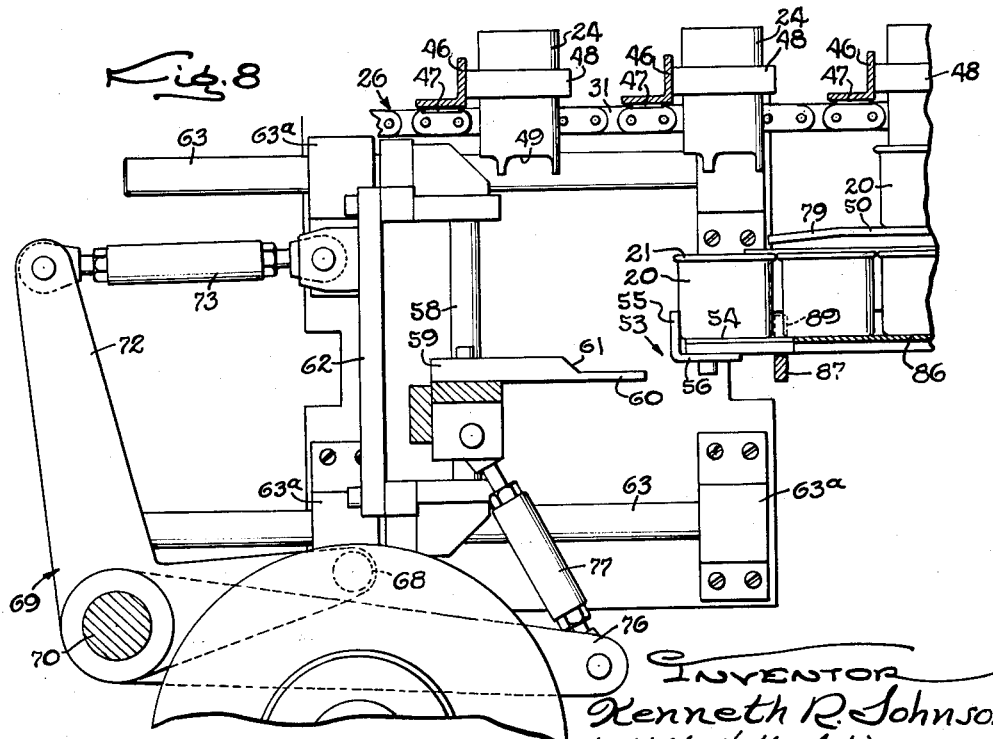

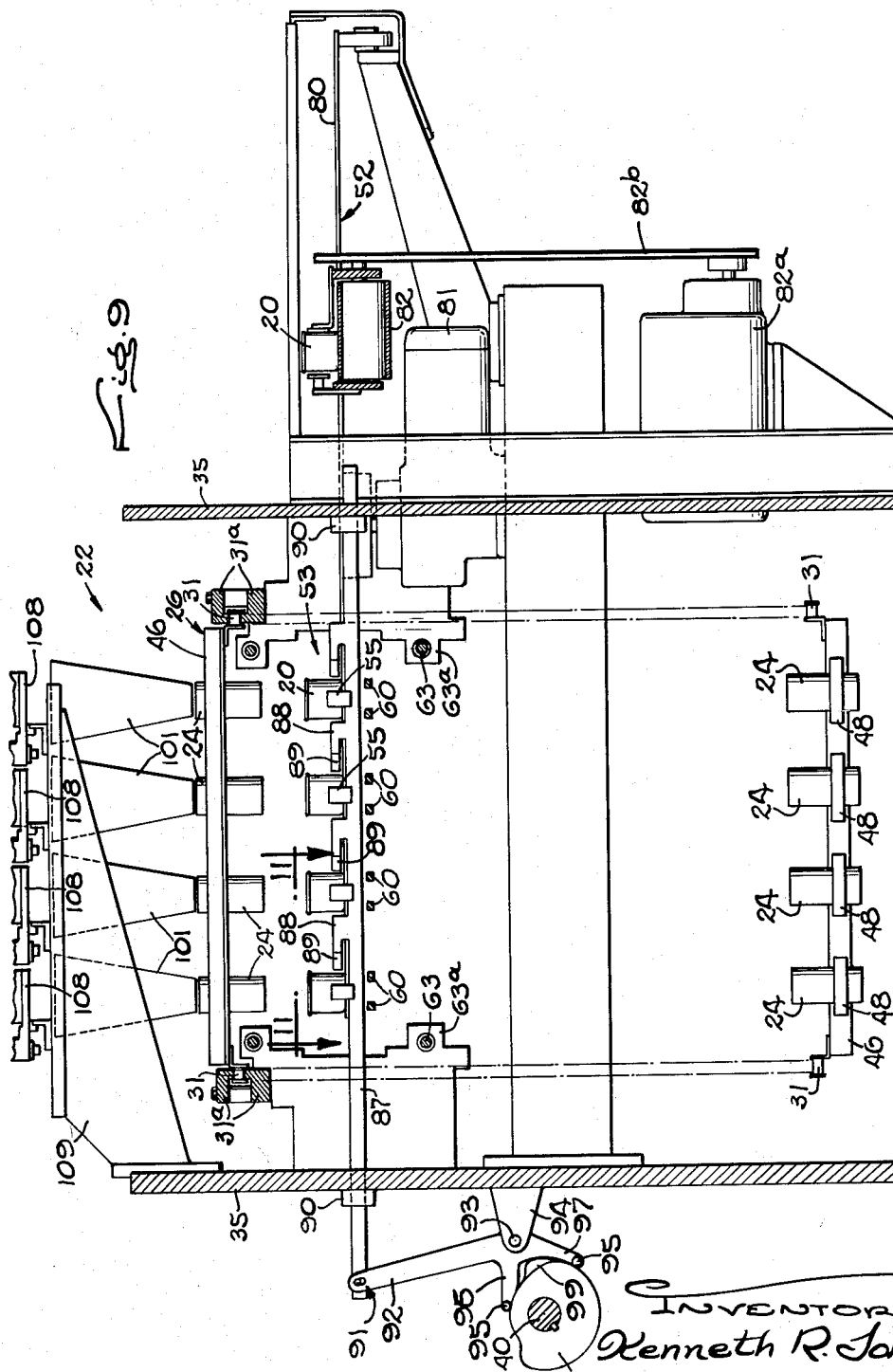

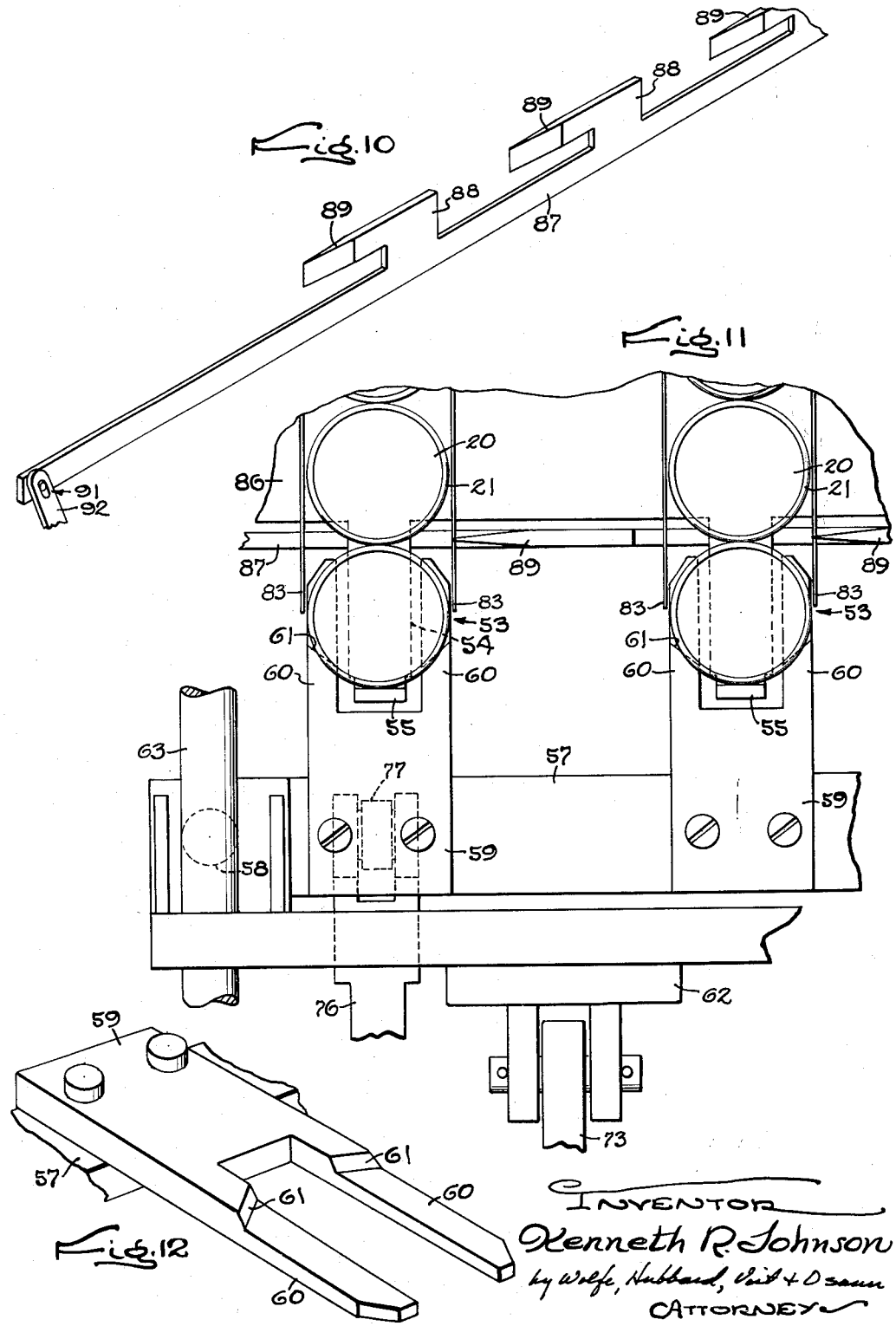

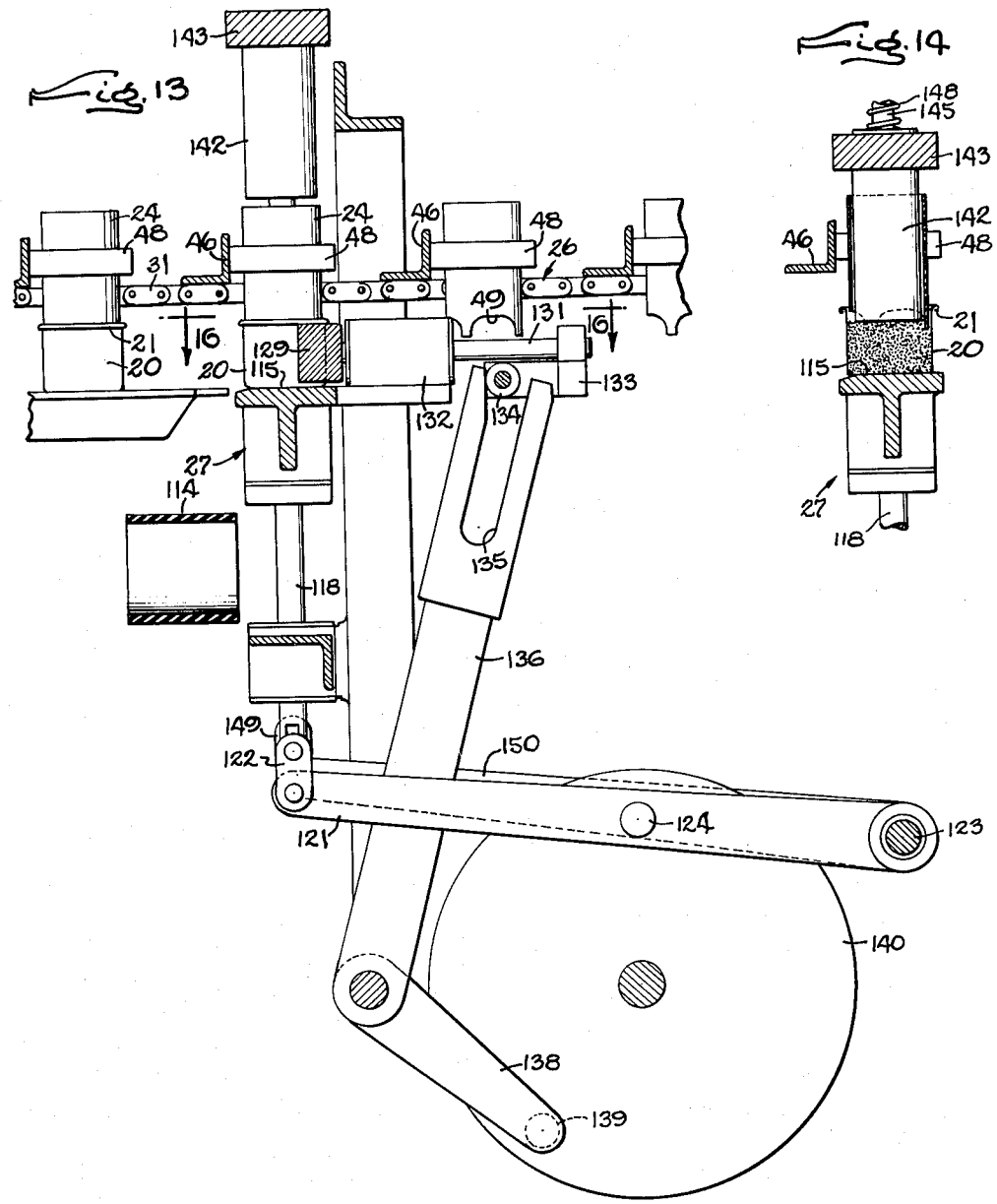

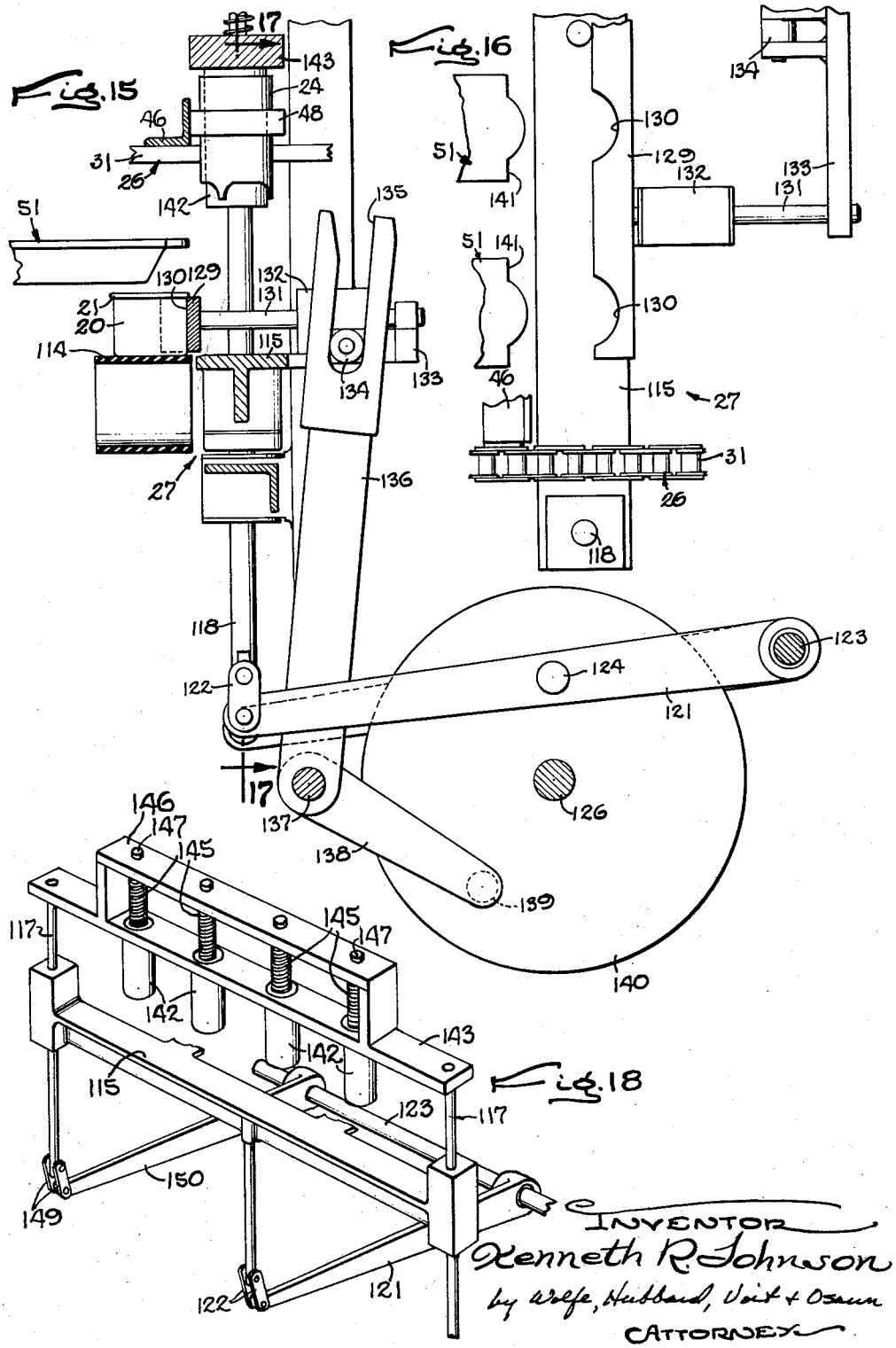

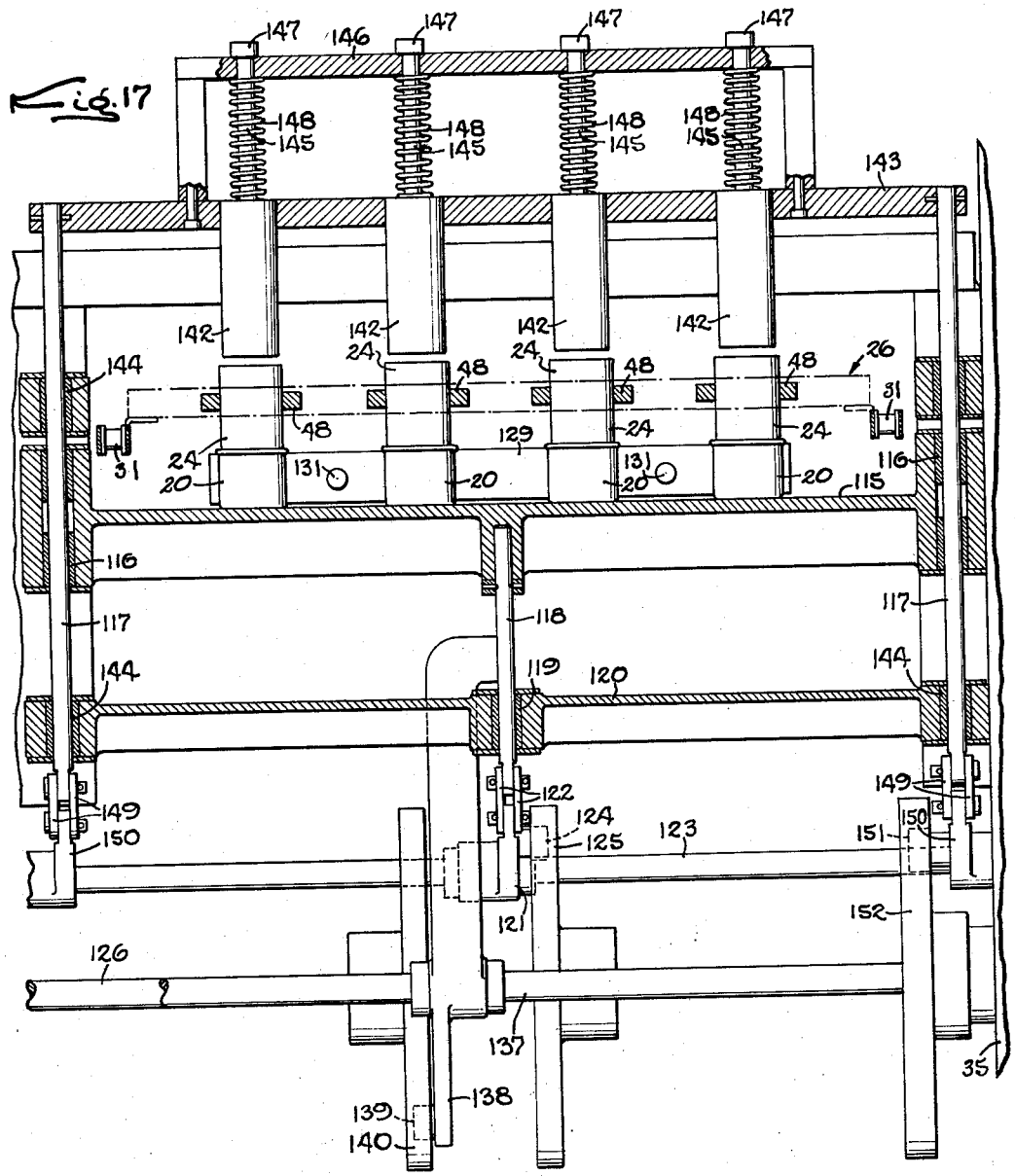

United States Patent Office 3,125,134
Patented Mar. 17, 1964

3,125,134
MACHINE FOR FILLING PREFORMED
CONTAINERS
Kenneth R. Johnson, Rockford, Ill., assignor to Bartelt
Engineering Company, Inc., Rockford, Ill., a corporation of Delaware
Filed June 4, 1962, Ser. No. 199,690
12 Claims. (Cl. 141—78)

This invention relates to a machine for filling preformed containers such as cans and has particular reference to a machine for filling prelabeled containers with a dry product like a dried soup mix.

The general object of the invention is to provide a new and improved machine of the above character in which the containers are moved through the stations at which they are filled by a novel mechanism which does not handle the outsides of the cans and thereby minimizes the possibility of damage to the labels on the containers.

A more detailed object is to telescope each container with an individual tube which projects into the container and to advance the tube laterally so that the tube, in turn, advances the container while permitting the container to be filled through the tube.

The invention also resides in the novel mechanism for moving the containers into telescoping relation with the corresponding tubes.

Other objects and advantages of the invention will become apparent from the following detailed description taken in connection with the accompanying drawings, in which FIGURE 1 is a plan view of a machine embodying the novel features of the present invention.

FIG. 2 is a schematic side elevation of the machine.

FIG. 3 is an enlarged sectional view taken along the line 3—3 in FIG. 1.

FIG. 4 is an enlarged fragmentary sectional view taken along the line 4—4 in FIG. 1.

FIG. 5 is a fragmentary sectional view taken along the line 5—5 in FIG. 3.

FIG. 6 is a view similar to FIG. 5 but shows the parts in a moved position.

FIG. 7 is a view similar to FIG. 5 but shows the parts in a second moved position.

FIG. 8 is a view similar to FIG. 5 but shows the parts in a still further moved position.

FIG. 9 is an enlarged fragmentary sectional view taken along the line 9—9 in FIG. 1.

FIG. 10 is a fragmentary perspective view of the mechanism used to separate the containers preparatory to telescoping the latter with the filling tubes.

FIG. 11 is an enlarged fragmentary sectional view taken along the line 11—11 in FIG. 9.

FIG. 12 is a fragmentary perspective view of the elevator used to raise the containers.

FIG. 13 is an enlarged fragmentary sectional view taken along the line 13—13 of FIG. 1.

FIG. 14 is a fragmentary view similar to FIG. 13 with the parts in a moved position.

FIG. 15 is a view similar to FIG. 13 but shows the parts in a further moved position.

FIG. 16 is a fragmentary sectional view taken along the line 16—16 in FIG. 13.

FIG. 17 is a fragmentary sectional view taken along the line 17—17 in FIG. 15.

FIG. 18 is a fragmentary perspective view of the mechanism for lowering the containers away from the filling tubes.

As shown in the drawings for purposes of illustration, the invention is embodied in a machine for depositing a dry product in a rigid, preformed container such as a can 20. The machine is particularly adapted for the packaging of a dried soup mix in which case a combination of products are deposited in the cans. For example, the mix may include several vegetables plus a soup base.

Herein, the cans are cup shaped with outturned lips 21 and, as delivered to the machine, they are prelabeled and are introduced to the machine open end up. The cans then are advanced edgewise along a predetermined path through a succession of stations. At one station 22, products such as the vegetables may be deposited in the can and, at a subsequent station 23, a measured quantity of soup base is delivered to the can.

The present invention contemplates the provision of a novel arrangement for advancing the cans 20 along the path and through the filling stations 22 and 23 and for filling the cans without handling the outsides thereby eliminating the possibility of damaging the labels while accurately and efficiently filling the cans. In the more detailed aspects of the invention, novel mechanism is provided for introducing the cans to and removing them from the path, this also being achieved without handling the outsides of the cans.

To the foregoing ends, each can 20 is telescoped with an individual tube 24 with the tube upright and inside the can and the tube is moved laterally along the filling path thereby advancing the can through each of the filling stations 22 and 23. At each station, a product is dispensed into the tube and thus into the can. Preferably, an elevator 25 located at the forward end or entrance to the filling path raises the cans successively into telescoping relation with the tubes 24 which are carried by a conveyor 26 and thereby advance the cans along the path. A similar elevator 27 may be disposed at the rear end of the path to lower the filled cans away from the tubes preparatory to removal of the cans from the machine.

In the present instance, the capacity of the machine is increased by advancing four cans side by side along parallel paths. For the sake of compactness, the second filling stations 23, 23ᵃ, 23ᵇ, and 23ᶜ for the four paths are staggered as shown most clearly in FIG. 1. To advance the four rows of cans in synchronism, the tubes 24 are mounted four abreast on the conveyor 26 so that there is a series of tubes for each path of the cans. As shown in FIG. 2, the conveyor 26 is in the form of an endless carrier driven by a motor 28 and having a horizontal run 29 extending along the filling path. From the end of this run, the carrier extends downwardly and then along an idle horizontal run 30 which is spaced below the active run.

Herein, the carrier 27 is composed of two endless chains 31 (FIG. 3) disposed in parallel vertical planes and laterally spaced apart. Each chain extends around three idler sprockets 32 (FIG. 2) which are keyed to shafts 33 (FIG. 3) journaled in bearings 34 on the base 35 of the machine. The chains also extend around drive sprockets 36 fast on a shaft 37 which similarly is journaled on the machine base by means of bearings 38 (FIG. 1). Along the filling run 29, the chains ride in stationary guides 31ᵃ to prevent the chains from sagging as they advance the cans. To drive the sprockets 36 from the motor 28, the output shaft 39 of the latter is coupled to a drive shaft 40 by means of a chain 41 extending around suitable sprockets. The drive shaft is coupled by means of a manually operated dog clutch 42 (FIGS. 1 and 2) to a second shaft 43 which, through a chain 44, drives the input of a suitable intermittent drive mechanism 45. The output of the latter is connected to the sprocket shaft 37 and thus imparts an intermittent motion to the conveyor chains 31. Through this drive, the chains are advanced through steps which are slightly longer than the diameter of the cans 20.

As illustrated in FIGS. 2 and 3, the tubes 24 are mounted on the chains 31 in groups of four and are spaced along the chains at distances equal to the steps through which the chains are advanced. Each group of tubes is mounted on the chains by means of a cross bar 46 which spans the chains, the opposite ends of the cross bar being secured to the corresponding links of the chains. Four brackets 47 (see FIG. 4) are welded to the cross bar at spaced points so as to be alined with the four paths of the cans and sleeves 48 rigid with the brackets receive the tubes 24 and hold the latter upright as they are advanced along the active run 29 of the carrier 26. Each tube is cylindrical and is slightly smaller in diameter than the cans so that the tubes project loosely into the cans as shown in FIG. 4. The lower edge portions of the tubes are cut away as indicated at 49 to reduce the volume of that part of the tube which projects into the can.

The four paths of the cans 20 are defined by two platforms 50 and 51 (FIG. 2) which are horizontal and disposed end to end. The cans as they enter the filling path rest on the platform 50 and are telescoped with the corresponding tubes 24. As the tubes are advanced by the chains 31, the cans are slid along the platform 50 through successive dwells, one such dwell being at the filling station 22. Subsequently, the tubes slide the cans off the platform 50 and onto the second platform 51 and the step-by-step advance of the cans is continued with each can dwelling at one of the filling stations 23, 23$^a$, 23$^b$, or 23$^c$.

In order to introduce the cans to the filling path, the cans are delivered by a feeding device 52 (FIGS. 1 and 2) to a pickup station 53 (FIG. 5) where the can is picked up by the elevator 25. The elevator raises the can into telescoping relation with the tube 24 dwelling directly above the pickup station and holds the can in this position until the next advance of the conveyor 26 at which time the tube slides the can off the elevator and onto the platform 50. While the elevator is holding a can in the raised position, the feeding device 52 moves the next can into the pickup position and then, after the first can has been moved off the elevator and onto the platform 50, the elevator moves back (to the left in FIG. 5) and down and then moves forward to project in under the next can at the pickup position. The parts are then ready to repeat the cycle and lift the next can up into telescoping relation with the succeeding tube 24.

In the present instance, there are four pickup positions 53 disposed side by side, there being one such position for each row of cans, and these positions are defined by narrow projections 54 (FIG. 11) extending rearwardly from the feeding device 52. The projections, which are narrower than the cans, support the latter until the cans are picked up by the elevator 25. At the outer end of each projection 54 is an upright arm 55 (FIGS. 5 and 11) which serve as stops and position the cans directly under the tube 24 with which it is to be telescoped. A leg 56 integral with the arm slides on the underside of the associated projection 54 so that the position of the arm may be adjusted to accommodate cans of different diameters.

The elevator 25 includes a horizontal cross bar 57 (FIGS. 5 and 11) which extends transversely of the machine with the opposite end portions of the cross bar slidably received on vertical guides 58. Four blocks 59, one for each pickup position 53, are bolted to the top of the cross bar 57 and are formed with laterally spaced fingers 60 which extend forwardly to straddle the corresponding projection 54. Initially, the fingers 60 are disposed beneath the associated projection 54 as shown in FIG. 5 and then, as the cross bar 57 slides up on the guides 58, the fingers move up on opposite sides of the projection and pick up the can. Continued upward movement of the fingers lifts the can into telescoping relation with a tube 24. As shown in FIG. 12, the upper sides of the fingers 60 are cut away to provide shoulders 61 which help in locating the cans accurately under the tubes 24.

In order to obtain the compound motion of the elevator, that is, both the up and down motion and the horizontal retraction, the vertical guides 58 are mounted on a frame 62 (FIG. 5) having parallel rods 63 which, in turn, slide in stationary horizontal guides 63$^a$. Thus, the cross bar 57 and the blocks 59 move up and down on the vertical guides 58 and also move bodily with the frame 62 in the horizontal guides 63$^a$. The horizontal motion of the frame 62 is effected by a pair of cams 64 (FIGS. 3 and 5) which are keyed to a transverse shaft 65. The latter is journaled in bearings 66 on the machine base 35 and is driven from the main drive shaft 40 through bevel gears 67. The followers 68 for the cams are carried by bell crank levers 69 which are fulcrumed on a stationary shaft 70 extending across the base 35. Each follower is carried on the free end of an arm 71 of the corresponding bell crank lever whose other arm 72 is connected to the back of the frame 62 by means of a link 73.

A second set of cams 74 are used for raising and lowering the cross bar 57 on the vertical guides 58 and coact with followers 75 carried intermediate the ends of two arms 76. Both arms are fulcrumed at one end on the shaft 70 while the other ends are coupled to the cross bar 57 through the medium of links 77. Both ends of the links 73 and 77 are connected to their associated parts through swivels 78 which permit the compound movement of the elevator 25.

With the foregoing arrangement, a cycle begins with the parts in the position shown in FIG. 5, that is, with the fingers 60 below the projections 54 and with a can 20 resting on each of the projections 54 in the pickup position 53. At this time, the frame 62 is forward and the cams 74 then are effective to raise the cross bar 57. As the latter moves up, the fingers pick up the cans in the pickup position and raise them into telescoping relationship with the tubes 24 which then are dwelling over the pickup position, this being shown in FIG. 6. While the parts are in this position, the feeding device 52 delivers a second set of cans to the feeding position and the chains 31 advance the tubes one step to slide the cans off the fingers 60 and onto the platform 50. The leading edge 79 of the platform may be inclined downwardly a small amount as shown in FIG. 6 to facilitate the transfer of the cans from the fingers to the platform. After the cans have been slid onto the platform 50, the cams 64 begin to retract the frame 62 and, simultaneously, the cams 74 lower the cross bar 57 as illustrated in FIG. 7. The two sets of cams are contoured so that the fingers 60 pass clear of the next set of cans in the pickup position and eventually the frame is fully retracted and the fingers in their lower most position as illustrated in FIG. 8. The cams 64 then complete the cycle by moving the frame forward so that the fingers again project in under the pickup position as illustrated in FIG. 5.

In order to deliver the cans to the pickup position 53, the feeding device 52 is in the form of a rotary table or dial 80 (FIGS. 1, 2 and 9) which is circular in shape and is disposed in a horizontal plane level with the projections 54. The dial is turned continuously about its axis by a separate motor 81. Empty cans are fed to the periphery of the dial by a suitable conveyor 82 driven by a motor 82$^a$ through a chain 82$^b$ (FIG. 9) and, as the dial is turned, it carries the cans up to a series of arcuate guides 83. These guides are concentric with the axis of the dial and define four channels 84, 84$^a$, 84$^b$ and 84$^c$. As the dial turns, the cans tend first to fill up the outer channel 84$^c$ and then they are cammed successively inwardly to the other channels by inclined end surfaces 85 on the guides 83. The guides curve through about a quarter of a circle and then are straight to extend to and alongside of the pickup positions 53.

The space between the pickup stations and the dial is filled by a stationary platform 86 and the projections 54 are formed integrally with this platform. Thus, the dial 80, in cooperation with the guides 83, feeds the cans in four separate groups to the respective pickup stations. The walls of the guides are vertical so that they are engaged only by the lips 21 of the cans 20 and do not engage the labeled part of the can. It will be observed that the dial 80 in effect brings the cans in transversely of the filling path thereby permitting the inactive run 30 of the conveyor 26 to be below the active run 29 and out of the way of the filling stations.

To separate the cans 20 at the pickup stations 53 from the cans in the channels of the feeding device 52, a bar 87, (FIGS. 6, 9, 10 and 11) is mounted to slide back and forth transversely of the platform 86. The bar is disposed beneath this platform and is formed with upstanding lugs 88 with integral fingers 89. The latter project horizontally and are disposed above the platform 86 so that, as the bar 87 is moved forward (to the left in FIG. 11), the fingers move across the inner ends of the projections 54 and behind the cans in the pickup position. The leading ends of the fingers may be tapered to facilitate entry of the fingers between the cans and to minimize the possibility of damage to the can exteriors. The fingers 89 when in the projected position not only separate the end cans but also prevent a second set of cans from entering the pickup position until the first set has been completely raised out of the way by the elevator 25.

As illustrated in FIG. 9, the rod 87 spans the sides of the base 35 and slides in bearings 90. One end of the rod is connected by a pin and slot connection 91 to a lever 92 which is fulcrumed at 93 on a stationary bracket 94. Followers 95 carried by arms 96 and 97 of the lever engage individual cams 98 and 99 on the drive shaft 40 (see FIG. 2) so that the cams positively move the rod in both directions. The cams are shaped to retract the fingers 89 as soon as the preceding cans have been completely raised by the elevator 25 and then, after an interval sufficient to permit a second set of cans to enter the pickup position, the cams return the fingers to the projected position.

After the cans have been indexed two steps along the platform 50 by the tubes 24, they are disposed at the filling station 22 where they receive the first fill. This fill may be composed of a combination of products and, for this purpose, the products first are dispensed into buckets 100 which then discharge the combined product into funnels 101 which empty into the tubes 24. Herein, the buckets are carried by a turret 102 which turns about a vertical axis and is driven by the main drive shaft 40 through a chain 103 and a speed reducer 104. The turret includes eight arms 105 projecting radially from the axis of the turret and each arm carries the four buckets 100 which are spaced apart so as to overlie the paths of the cans when the associated arm passes over the filling station 22. As the turret rotates about its axis, it passes first beneath a set of four dispensing devices 106 (FIG. 2) which deposit a measured quantity of one product in the buckets and then, upon continued turning of the turret, the buckets pass beneath a second set of filling devices 107 which deposit quantities of another product in the bucket. Of course, there may be several such dispensing units disposed around the circular path of the turret.

As the buckets move from one set of dispensers to the next, the product is held in the buckets by gates 108 (FIG. 9) which close the bucket outlets. As the buckets approach the filling station 22, the gates are opened automatically by a suitable tripping device (not shown) so that the products collected in the bucket flow out through the bucket outlet. At this time, these buckets are passing over the four stationary funnels 101, which are held by a bracket 109 on the base 35, and a tube and a can are dwelling beneath each funnel. Thus, the product falls from the bucket into the funnel and flows through the tube and into the can.

After several advances beyond the filling station 22, the tubes 24 advance the cans from the platform 50 onto the platform 51. As the cans reach the filling stations 23, 23ª, 23ᵇ and 23ᶜ, the soup base is deposited in the tubes by filling devices 110. The latter may be of any suitable construction such as the type in which a measured amount of product is dispensed by an accurately controlled auger.

In some instances, the product is quite loose as it is dispensed into the can and it actually overfills the can. In other words, the product extends up into the tube and above the level of the can lip 21 as illustrated in FIG. 4. To settle the product in the can, means is provided for vibrating the platform 51 and, herein, this means comprises a motor 111 (FIG. 2) which drives an eccentric 112 connected to the underside of the platform by a parallelogram linkage 113. The platform is vibrated continuously so that there is a successive settling of the product in the can as the latter move from one end to the other of the platform.

After the cans have been filled and compacted, they are transferred from the platform 51 to a conveyor 114 (FIG. 13) which, like the dial 80, moves the cans across the filling path and may carry the cans to a suitable capping machine (not shown). For this purpose, the second elevator 27 is disposed adjacent the end of the platform 51 and, in its upper position, the platform 115 of the elevator is level with the platform 51 so that the tubes 24 index the cans onto the elevator. The elevator platform 115 is an elongated horizontal bar extending transversely of the machine and formed at opposite ends with bushings 116 (FIG. 17) which slide on vertical rods 117. A rod 118 pinned to the underside of the elevator platform projects down through a bushing 119 in a cross bar 120 of the base 35 and the lower end of the rod is pivotally connected to a lever 121 by means of links 122 (see FIGS. 13 and 17). The lever is loosely fulcrumed at one end on a shaft 123 which extends transversely of the machine and, intermediate its ends, the lever carries a follower roll 124 which coacts with a cam 125. The latter is keyed to a shaft 126 which is journaled on the machine base and is driven from the main drive shaft 40 through a chain 127 (FIG. 2) and a speed reducer 128. By swinging the lever 121 about its fulcrum 123, the cam 125 is effective to move the elevator platform 115 between its upper position as shown in FIG. 13 and its lower position in which it is alined with the conveyor 114 (FIG. 15).

As the cans are indexed onto the elevator platform 115, they are moved up against a pusher bar 129 (FIGS. 13 and 16) which extends transversely of the machine along the back side of the elevator platform. The forward edge of the pusher is formed with four arcuate notches 130 which are alined with the paths of the cans and receive the cans when the latter are on the elevator platform. Projecting rearwardly from the back of the pusher 129 are two spaced rods 131 which slide in brackets 132 rigid with the elevator platform 115 so that the pusher 129 moves up and down with the elevator platform but is free to slide back and forth across the latter. The rear ends of the rods are tied together by a cross bar 133 which carries a roller 134. The roller slides in a slot 135 formed in the upper end of a generally upright arm 136 whose lower end is keyed to a shaft 137 which extends transversely of the machine and is journaled in the base 35. Also keyed to the shaft 137 is a second arm 138 which carries a follower 139 riding on a cam 140, this cam being fast on the same shaft 126 as the cam 125. The cam 140 is shaped to swing the arm 136 counterclockwise as viewed in FIG. 13 after the elevator platform 115 reaches its lower position and this slides the pusher 129 forward and moves the cams from the elevator platform to the conveyor 114. As the elevator platform is returned to its upper position, the cam 140 swings the arm 136 in the opposite direction to retract the pusher. As shown in FIG. 16, the adjacent edge of the vibrating platform 51 may be cut away as indicated at 141 to provide clearance for the pusher as the elevator platform is being raised.

If desired, means in addition to the vibrating platform 51 may be provided for compacting the product within the cans 20. Herein, this means includes four plungers 142 (FIGS. 13 and 17) which normally are disposed above the tubes 24 when the latter are dwelling over the elevator platform 15 and which are lowered through the tubes and against the product in the cans. The plungers are cylindrical and smaller in diameter than the tubes 24 and slide vertically in a frame 143 which extends across the machine above the elevator 27. The opposite ends of the frame are pinned to the upper ends of the rods 117 (FIG. 17) which slide vertically in stationary bushings 144. Pins 145 projecting upwardly from the plungers 142 and through a cross bar 146 on the frame 143 are formed with heads 147 at their upper ends to serve as stops and limit the downward sliding of the plungers relative to the frame. Springs 148 acting between the upper ends of the plungers and the cross bar 146 urge the plungers downwardly but yield to permit the frame 143 to move down relative to the plungers.

To move the frame 143 up and down, the lower ends of the rods 117 are connected by links 149 to the free ends of levers 150 which are keyed to the shaft 123. Intermediate its ends, one of the levers 150 carries a follower 151 which engages a cam 152 fast on the shaft 123. The cam 152 is shaped to lower the frame 143 at the same time as the elevator platform 115 is lowered but at a faster rate. As a result, the plungers 142 are projected through the tubes 24 and pressed against the product in the cans. The overtravel of the frame 143 compresses the springs 148 which thereby urge the plungers against the product and produce a tamping action. The plungers also are effective to insure removal of the cans from the tubes 24.

As shown in FIGS. 1 and 2, the manually operated clutch 42 is located between the intermittent drive mechanism 45 and the drive for the camshaft 126. With this arrangement, both elevators 25 and 27 may be operated manually without indexing the tubes 24 so that the machine may be initially set up and timed. For this purpose, a hand wheel 153 journaled on the machine base 35 turns a pinion 154 which meshes with a spur gear 155 keyed to the main drive shaft. Also coacting with the drive shaft is an electromagnetic brake 156 which is deenergized while the machine is in operation but is energized when the machine is stopped.

I claim as my invention:

1. A machine for filling cans of uniform height having, in combination, an endless movable conveyor supported in a vertical plane and having an upper run guided along a straight horizontal path, a multiplicity of tubular filling spouts adapted to telescope loosely within said cans and supported on and spaced uniformly along said conveyor for travel along said horizontal path with their parallel axes disposed vertically while traveling along said path, an elongated horizontal track disposed within said conveyor short of the ends thereof and spaced below the lower ends of the upper row of said spouts a distance less than the height of said cans, mechanism for indexing said conveyor at spaced intervals to advance said row of spouts to and along said track in steps equal in length to the spacing of the spouts with dwells between successive steps, mechanism operable during each dwell of said conveyor to elevate an empty can into telescoping relation with the lower end of the first spout short of the inlet end of said track and support such can substantially at the level of said track during the initial part of the next indexing step during which such spout engages the inside of the can and slides the latter onto said track, a filler intermediate the ends of said track operable to discharge a quantity of material to be canned into the upper end of one of said spouts during one of said dwell periods, and means for vibrating at least a portion of said track to settle the material in the cans.

2. In a machine for packaging a product in a rigid container having an open end, the combination of, a base, a horizontal support mounted on said base and defining a predetermined path, an endless carrier mounted on said base and having a horizontal run extending over said path, a plurality of tubes mounted on said carrier for bodily movement therewith and spaced apart along said carrier to be advanced successively along said path, said tubes projecting downwardly toward said support as they move along said path, mechanism operable to drive said carrier and advance said tubes from one end of said path to the other end, an elevator disposed adjacent said one path end and movable from a first position below said support to a second position level with the support, means for delivering an empty container open end up to said elevator when the latter is in said first position, mechanism operable in timed relation to the advance of said carrier and operable to move said elevator from said first position to said second position thereby to raise a container into telescoping relation with a tube, said tube sliding the container onto said support and along said path in the continued advance of said carrier, a filling device disposed along said path and operable to deposit measured quantities of product into each of said tubes successively thereby to fill said containers, and mechanism for vibrating at least a part of said support to settle the product in the containers.

3. A machine for filling cans of uniform height having, in combination, an endless movable conveyor supported in a vertical plane and having an upper run guided along a straight horizontal path and a lower inactive run, a multiplicity of tubular filling spouts adapted to telescope loosely within said cans and supported on and spaced uniformly along said conveyor for travel along said horizontal path with their parallel axes disposed vertically while traveling along said path, an elongated horizontal track disposed within said conveyor short of the ends thereof and spaced below the lower ends of the upper row of said spouts a distance less than the height of said cans, mechanisms for indexing said conveyor at spaced intervals to advance said row of spouts to and along said track in steps equal in length to the spacing of the spouts with dwells between successive steps, mechanism operable during each dwell of said conveyor to elevate an empty can into telescoping relation with the lower end of the first spout short of the inlet end of said track and support such can substantially at the level of said track during the initial part of the next indexing step during which such spout engages the inside of the can and slides the latter onto said track, a filler intermediate the ends of said track operable to discharge a quantity of material to be canned into the upper end of one of said spouts during one of said dwell periods, a horizontal unloading conveyor extending transversely of said path from a point between said runs and adjacent but below the exit end of said track, and mechanism for lowering successive cans from said exit end to said unloading conveyor.

4. In a machine for packaging a product in a rigid container having an open end, the combination of, a base, a horizontal support mounted on said base and defining a predetermined path, an endless carrier mounted on said base and having a horizontal active run extending over said path and an inactive run beneath said support, a plurality of tubes mounted on said carrier for bodily movement therewith and spaced apart along said carrier to be advanced successively along said path, said tubes projecting downwardly toward said support as they move along said path, mechanism operable to drive said carrier and advance said tubes from one end of said path to the other end, a first elevator disposed adjacent said one path end and movable from a first position below said support to a second position level with the support, means for delivering an empty container open end up to said elevator when the latter is in said first position, mechanism operable in timed relation to the advance of said carrier and operable to move said elevator from said first position to said second position thereby to raise a container into telescoping relation with a tube, said tube sliding the container onto said support and along said path in the continued advance of said carrier, a filling device disposed along said path and operable to deposit measured quantities of product into each of said tubes successively thereby to fill said containers, a horizontal conveyor extending transversely of said path from a point between said runs and adjacent but below the opposite end of said path, and a second elevator disposed adjacent said opposite end to lower filled containers from said support to said conveyor.

5. In a machine for packaging a product in a rigid container having an open end, the combination of, a base, a horizontal support mounted on said base and defining a predetermined path, an endless carrier mounted on said base and having a horizontal run extending over said path, a plurality of tubes mounted on said carrier for bodily movement therewith and spaced apart along said carrier to be advanced successively along said path, said tubes projecting downwardly toward said support as they move along said path, mechanism operable to drive said carrier and advance said tubes from one end of said path to the other end, a first elevator disposed adjacent said one path end and movable from a first position below said support to a second position level with the support, means for delivering an empty container open end up to said elevator when the latter is in said first position, mechanism operable in timed relation to the advance of said carrier and operable to move said elevator from said first position to said second position thereby to raise a container into telescoping relation with a tube, said tube sliding the container onto said support and along said path in the continued advance of said carrier, a filling device disposed along said path and operable to deposit measured quantities of product into each of said tubes successively thereby to fill said containers, and a second elevator disposed at the opposite end of said path and operable to receive a filled can and lower the latter away from the associated tube.

6. In a machine for packaging a product in a rigid container having an open end, the combination of, a base, a horizontal support mounted on said base and defining a predetermined path, an endless carrier mounted on said base and having a horizontal active run extending over said path and an inactive run beneath said path, a plurality of tubes mounted on said carrier for bodily movement therewith and spaced apart along said carrier to be advanced successively along said path, said tubes projecting downwardly toward said support as they move along said path, mechanism operable to drive said carrier and advance said tubes from one end of said path to the other end, an elevator having a platform disposed adjacent said one path end and movable from a first position below said support to a second position level with the support, mechanism for delivering empty containers transversely of said path to said platform when the latter is in said first position, mechanism operable in timed relation to the advance of said carrier and operable to move said elevator from said first position to said second position thereby to raise a container into telescoping relation with a tube, said tube sliding the container onto said support and along said path in the continued advance of said carrier, and a filling device disposed along said path and operable to deposit measured quantities of product into each of said tubes successively thereby to fill said containers.

7. A machine for filling cans of uniform height having, in combination, an endless movable conveyor supported in a vertical plane and having an upper run guided along a straight horizontal path and a lower inactive run, a multiplicity of tubular filling spouts adapted to telescope loosely within said cans and supported on and spaced uniformly along said conveyor for travel along said horizontal path with their parallel axes disposed vertically while traveling along said path, an elongated horizontal track disposed within said conveyor short of the ends thereof and spaced below the lower ends of the upper row of said spouts a distance less than the height of said cans, mechanism for indexing said conveyor at spaced intervals to advance said row of spouts to and along said track in steps equal in length to the spacing of the spouts with dwells between successive steps, a member movable transversely of said path and operable to deliver cans successively to a loading position between said runs and adjacent the inlet end of said track, mechanism operable during each dwell of said conveyor to elevate an empty can from said loading position into telescoping relation with the lower end of the first spout short of the inlet end of said track and support such can substantially at the level of said track during the initial part of the next indexing step during which such spout engages the inside of the can and slides the latter onto said track, and a filler intermediate the ends of said track operable to discharge a quantity of material to be canned into the upper end of one of said spouts during one of said dwell periods.

8. A machine for filling cans of uniform height having, in combination, an endless movable conveyor supported in a vertical plane and having an upper run guided along a straight horizontal path, a multiplicity of tubular filling spouts adapted to telescope loosely within said cans and supported on and spaced uniformly along said conveyor with their parallel axes disposed vertically while traveling along said path, an elongated horizontal track disposed within said conveyor short of the ends thereof and spaced below the lower ends of the upper row of said spouts a distance less than the height of said cans, mechanism for indexing said conveyor at spaced intervals to advance said row of spouts to and along said track in steps equal in length to the spacing of the spouts with dwells between successive steps, a platform at the inlet end of said track mounted for vertical movement between a lower position and an upper position substantially at the level of said track for sliding a can off from the platform onto said track during each advance of the conveyor, a filler intermediate the ends of said track operable to discharge a quantity of material to be canned into the upper end of one of said spouts during one of said dwell periods, mechanism operable while said platform is lowered to deliver an empty can open-end-up onto said platform and in axial alinement with one of said spouts, and means operable during each of said conveyor dwells to raise said platform to said upper position and telescope the open end of the can thereon with one of said spouts whereby to cause the spout to engage the side of the can and slide the latter sidewise onto said track during the next indexing step and then along the track during the succeeding steps.

9. In a machine for packaging a product in a rigid container having an open end, the combination of, a base, a horizontal support mounted on said base and defining a predetermined path, an endless carrier mounted on said base and having a horizontal run extending over said path, a plurality of tubes mounted on said carrier for bodily movement therewith and spaced apart along said carrier to be advanced successively along said path, said tubes projecting downwardly toward said support as they move along said path, mechanism operable to drive said carrier and advance said tubes from one end of said path to the other end, an elevator disposed adjacent said one path end and movable from a first position below said support to a second position level with the support, means for delivering an empty container open end up to said elevator when the latter is in said first position, mechanism operable in timed relation to the advance of said carrier and operable to move said elevator from said first position to said second position thereby to raise a container into telescoping relation with a tube, said tube sliding the container onto said support and along said path in the continued advance of said carrier, and a filling device disposed along said path and operable to deposit measured quantities of product into each of said tubes successively thereby to fill said containers.

10. A machine for filling cans of uniform height having, in combination, an endless movable conveyor supported in a vertical plane and having an upper run guided along a straight horizontal path, a multiplicity of tubular filling spouts adapted to telescope loosely within said cans and supported on and spaced uniformly along said conveyor for travel along said horizontal path with their parallel axes disposed vertically while traveling along said path, an elongated horizontal track disposed within said conveyor short of the ends thereof and spaced below the lower ends of the upper row of said spouts a distance less than the height of said cans, mechanism for indexing said conveyor at spaced intervals to advance said row of spouts to and along said track in steps equal in length to the spacing of the spouts with dwells between successive steps, mechanism operable during each dwell of said conveyor to elevate an empty can into telescoping relation with the lower end of the first spout short of the inlet end of said track and support such can substantially at the level of said track during the initial part of the next indexing step during which such spout engages the inside of the can and slides the latter onto said track, and a filler intermediate the ends of said track operable to discharge a quantity of material to be canned into the upper end of one of said spouts during one of said dwell periods.

11. A can filling machine as defined in claim 10 including a vertically movable platform beyond the other end of said track for receiving a filled can transferred off from the track during indexing of the conveyor and by the spout telescoped with such can during filling thereof, and means for lowering said second platform during the initial part of one of said conveyor dwells and raising the same substantially to the level of said track before the next indexing of said conveyor.

12. A machine for filling cans of uniform height having, in combination, an endless movable conveyor supported in a vertical plane and having a run guided along a straight horizontal path, a multiplicity of tubular filling spouts adapted to telescope loosely within said cans and supported on and spaced uniformly along said conveyor for travel along said horizontal path with their parallel axes disposed vertically while traveling along said path, an elongated horizontal track spaced below the lower ends of the spouts on said run a distance less than the height of said cans, mechanism for driving said conveyor to advance said row of spouts to and along said track, mechanism operable in timed relation with said conveyor to elevate an empty can into telescoping relation with the lower end of the first spout short of the inlet end of said track and support such can substantially at the level of said track until such spout engages the inside of the can and slides the latter onto said track, and a filler intermediate the ends of said track operable to discharge a quantity of material to be canned into the upper end of one of said spouts.

References Cited in the file of this patent
UNITED STATES PATENTS

| | | |
|---|---|---|
| 993,230 | Englen | May 23, 1911 |
| 2,619,271 | McHale et al. | Nov. 25, 1952 |
| 2,989,090 | Wolter | June 20, 1961 |